United States Patent [19]
Terada

[11] 3,732,364
[45] May 8, 1973

[54] MAGNETIC TAPE RECORDING AND REPRODUCING SYSTEM

[75] Inventor: Toshimichi Terada, Inagi-shi, Japan

[73] Assignee: Hitachi, Ltd., Tokyo, Japan

[22] Filed: Apr. 18, 1972

[21] Appl. No.: 245,155

[30] Foreign Application Priority Data

April 21, 1971 Japan..............................46/25238

[52] U.S. Cl...................178/6.6 A, 179/100.2 MD, 340/174.1 G, 340/174.1 H

[51] Int. Cl...............................................H04n 5/62

[58] Field of Search..................................178/6.6 A; 179/100.2 MD; 340/174.1 G, 174.1 H

[56] References Cited

UNITED STATES PATENTS

| | | | |
|---|---|---|---|
| 3,501,586 | 3/1970 | Russell | 340/173 LM |
| 3,624,281 | 11/1971 | Pham | 178/6.6 A |
| 3,659,042 | 4/1972 | Kennedy | 178/6.6 A |

*Primary Examiner*—Terrell W. Fears
*Attorney*—Paul M. Craig, Jr. et al.

[57] ABSTRACT

A magnetic tape recording and reproducing system wherein a television signal and digital information are recorded in multiplex recording on the same area of a magnetic tape. In recording, according to an external instruction specifying a picture frame and digital information to be recorded, the horizontal sync. signal for the specified picture frame is extracted, and the extracted horizontal sync. signal is used to produce shift pulses determining the region for recording digital information. The digital information which is separately recorded is read out in accordance with the shift pulses thus produced, and the digital signal thus read out is used to modulate a sinusoidal signal at a frequency outside of the frequency band of the television signal for recording of the modulated signal in superimposition upon the television signal on the same area of the magnetic tape.

In reproduction, the recorded digital information signal is separated through a tuned amplifier, and the digital information and the television signal are recovered through a sequence of process similar to that at the time of the recording.

6 Claims, 11 Drawing Figures

MAGNETIC TAPE RECORDING AND REPRODUCING SYSTEM

BACKGROUND OF THE INVENTION

1. Field of the Invention

This invention relates to magnetic recording and reproducing systems and, more particularly, to magnetic tape recording and reproducing systems where a television signal and a digital control signal are recorded in multiplex recording on the same area of a magnetic tape. More specifically, the invention concerns with means for effectively carrying out digital recording, which is particularly useful in the use of video tape recorders (hereinafter referred to as VTR) as picture file means for educational and training purposes or merely for checking purposes.

2. Description of the Prior Art

As the magnetic tape recording and reproducing system where television signal and digital information are recorded on the same magnetic tape there are video file systems. As is well known, in these systems the television signal and digital signal representing the file addresses are recorded in separate areas. Therefore, in these systems it is necessary to provide an extra space or area for recording the digital signal in addition to the area for recording of the television signal.

SUMMARY OF THE INVENTION

The principal object of the invention, accordingly, is to realize a magnetic tape recording and reproducing system, in which the television signal and digital signal is recorded in multiplex recording without requiring any extra area for the recording of the digital signal and nevertheless resulting in no deterioration of the picture quality of reproduction and no malfunctioning of the system.

Another object of the invention is to provide a new recording method for achieving the above end.

A further object of the invention is to realize the above multiplex recording system of a comparatively simple construction.

According to the invention, in recording television signal through FM modulation, a frequency or frequencies outside of the television signal frequency band is modulated with a digital signal synchronized to the horizontal sync. signal of the television signal, and the modulated signal thus obtained is recorded by a magnetic head in superimposition upon the television signal. In reproduction, the original digital signal is separated from the television signal through a tuned amplifier, and recovered through a digital circuit.

As an example of the application of the invention, it may be used in the check of the access position of VTR picture files. In the picture file, each picture frame has a peculier address. Such addresses (which can be represented by digital signals) may be recorded in the afore-mentioned manner in multiplex recording together with the television signal. Thus, in the playback it is possible to tell what is the current address. Also, if access is made to a wrong position, correct access may be made afresh.

The above and other objects, features and advantages of the invention will become more apparent from the description in conjunction with the accompanying drawings.

FIGS. *5a* and *5b* are block diagrams showing recording section and reproducing section respectively in one embodiment of the invention.

Figure 6:
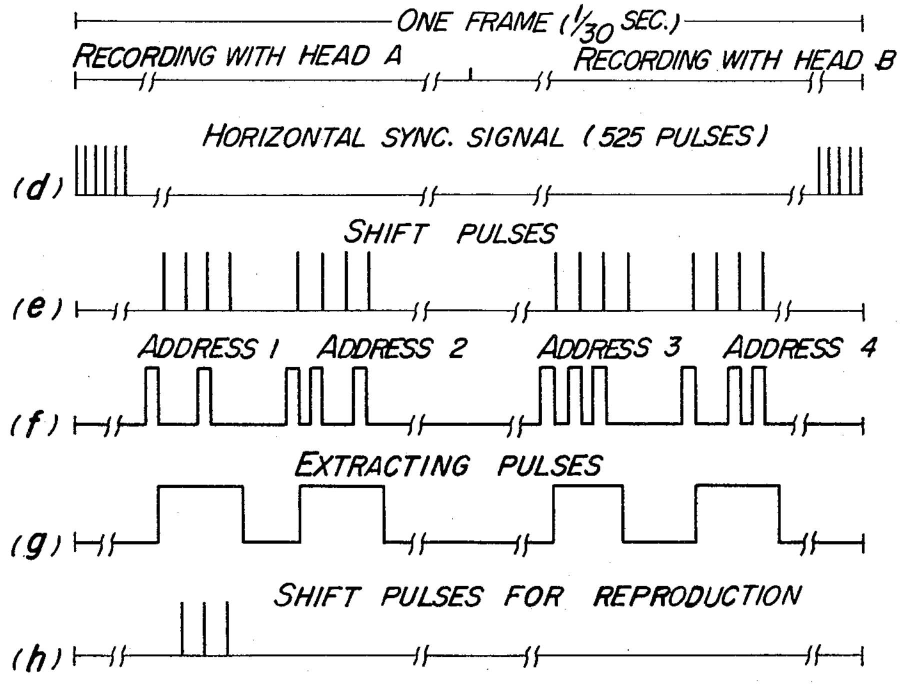
Figures 5A, 5B:
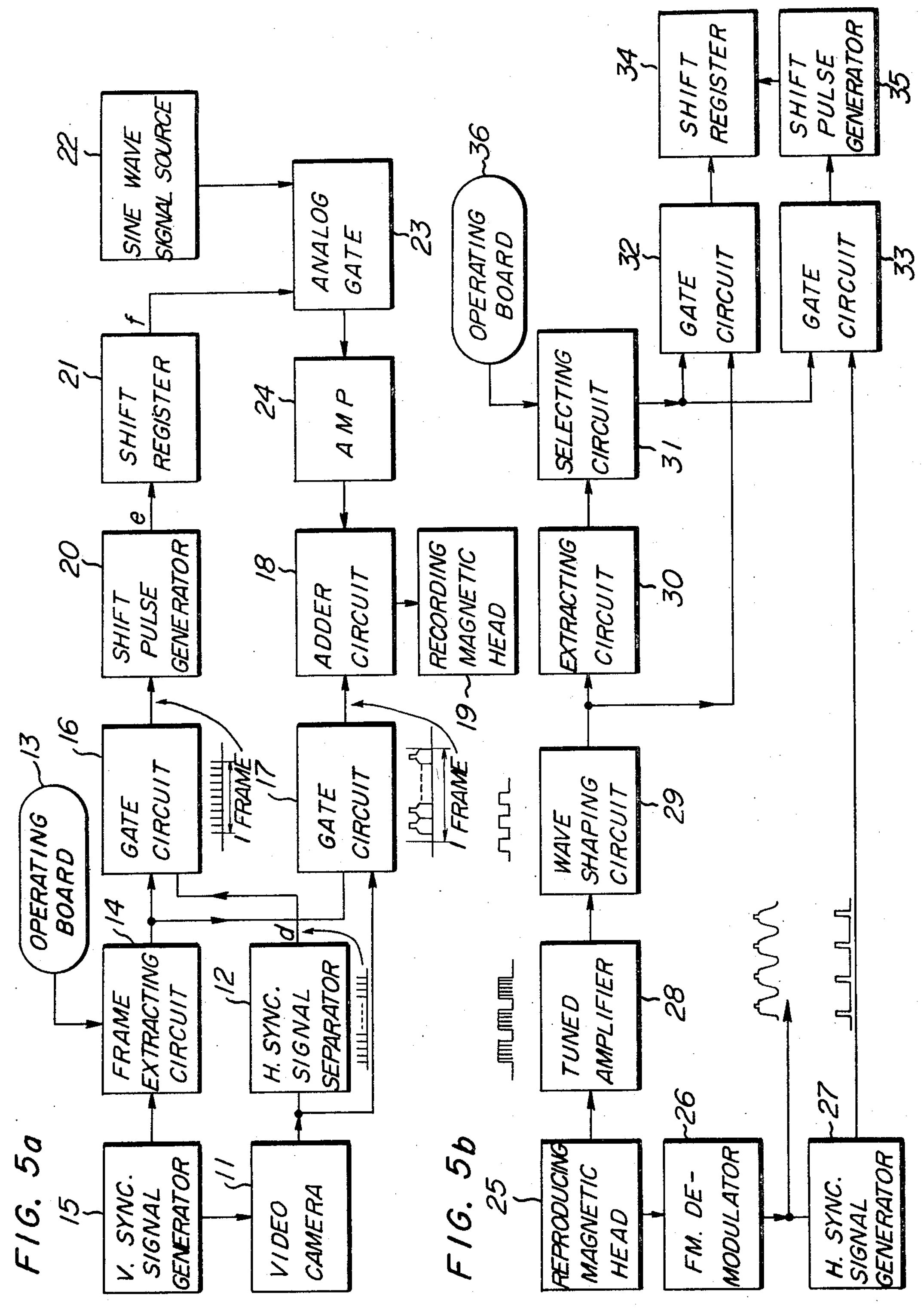

FIG. 6 is a waveform chart to illustrate the operation of the system shown in FIGS. *5a* and *5b*.

Figure 7:
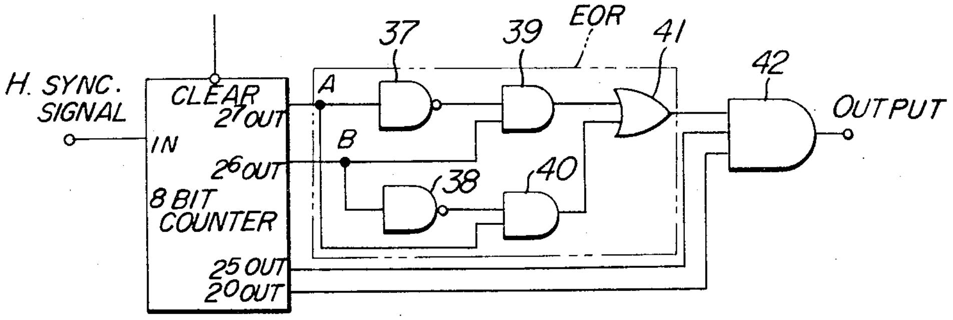

FIG. 7 is a schematic representation of an example of the shift pulse generator in the embodiment of FIGS. *5a* and *5b*.

Figure 8:
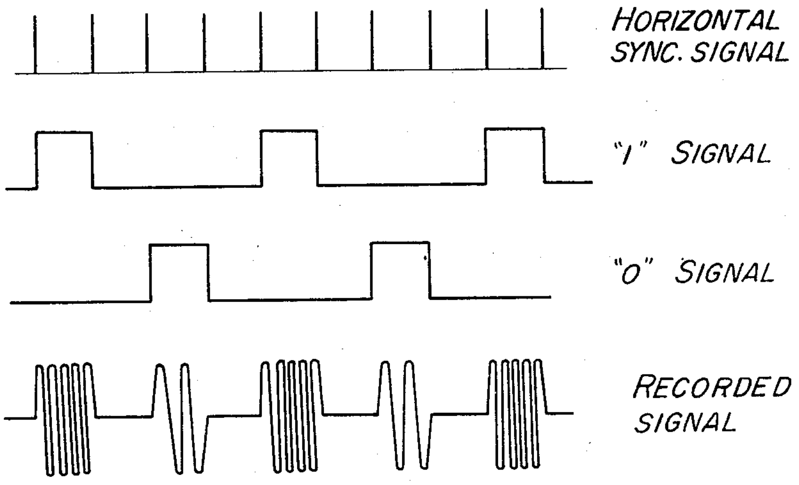

FIG. 8 is a waveform chart to illustrate the operation of another embodiment.

FIGS. *9a* and *9b* are block diagrams showing part of another embodiment of the invention.

DESCRIPTION OF THE PREFERRED EMBODIMENTS

Figure 1:
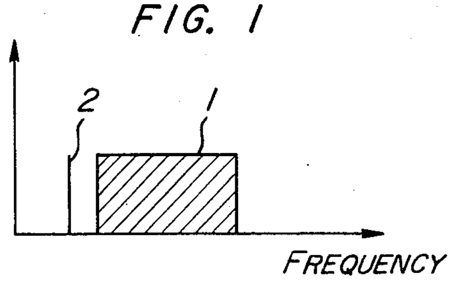
FIG. 1 is a graph showing the frequency requirements of signals involved in practicing the invention.

FIG. 1 shows the frequency requirements of signals involved in carrying out the invention. Reference numeral 1 designates a frequency band required for recording the television video signal through frequency modulation, and numeral 2 a pilot signal component.

Figure 2:
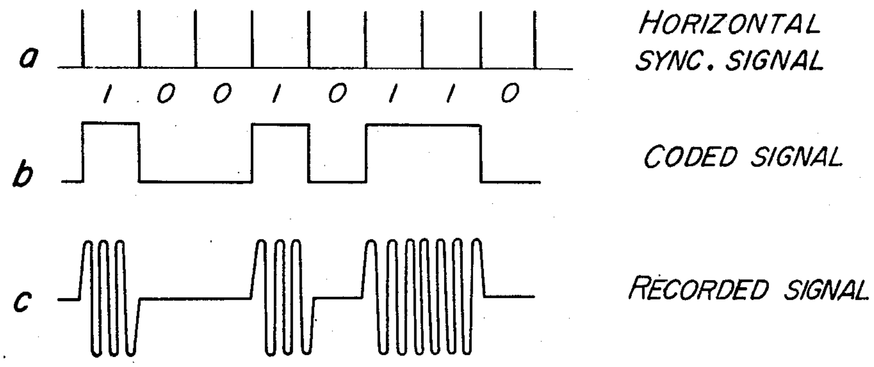
FIG. 2 is a waveform chart to illustrate the principles underlying the invention.
Figure 3:
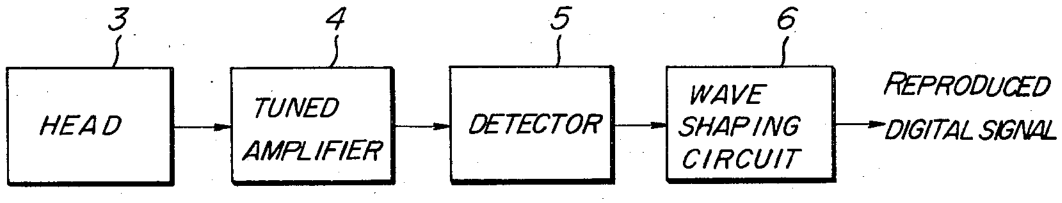
FIG. 3 is a block diagram showing a reproducing section in one embodiment of the invention.

In accordance with the invention, a coded digital signal shown at *b* in FIG. 2, which is in a synchronous relation to the horizontal sync. signal shown at a of the television signal, is recorded in the form of amplitude modulation (shown at c in FIG. 2) on a signal of a particular frequency in a frequency region free from the frequency components shown in FIG. 1 on the same area of the magnetic tape as the area in which the video signal is recorded. The reproduction of the coded digital signal is effected with an arrangement as shown in FIG. 3. More particularly, the electric signal recovered by reproducing magnetic head 3 and containing the television signal as well as the coded digital signal is coupled to a tuned amplifier 4 to separate the coded digital signal from the television signal, and then the original digital signal (shown at *b* in FIG. 2) is reproduced through detector 5 and wave shaping circuit 6. The digital signal thus reproduced is used for the drive control of the recording and reproducing system.

Although the invention finds various applications, for the sake of simplifying the description in conjunction with its application in educational and training means, in which a digital signal is recorded for each frame of the picture file utilizing the VTR, and which is a beneficial employment of the invention.

Figure 4:
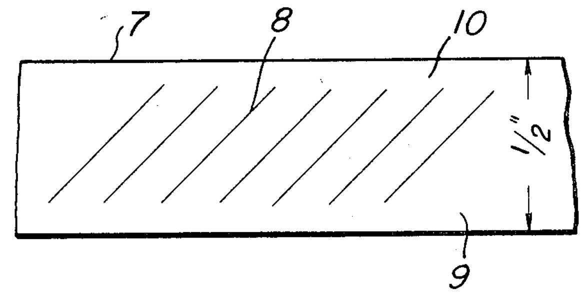
FIG. 4 is a fragmentary plan view of a magnetic tape employed in one embodiment of the invention.

FIG. 4 shows a fragmentary plan view of the record state of magnetic tape 7 employed in the system according to the invention. In the helical scan type VTR, the video signal contained in one field is recorded in one track 8 on the tape. When the tape 7 is stopped and a particular track 8 is repeatedly scanned with a rotary head, a particular stationary picture reproduction is obtained, that is, still reproduction is obtained. In the usual system, the audio signal and drive control signal are recorded in areas 9 and 10, in which the video signal is not recorded. In accordance with the invention, the control signal or corded digital signal is recorded together with the video signal on the same track 8 as will be described hereinafter in detail.

With two-head systems, by suitably spacing the two heads in the axial direction of the rotary drum so that the two heads draw separate loci, it is possible to obtain still reproduction for two fields (one frame). Usually, in the VTR slightly different pieces of information are recorded on successive tracks so that they are continuously reproduced to obtain motion in the reproduction. According to the invention, entirely different may be accommodated in successive tracks, so as to obtain a picture file for their random access.

For use of the system according to the invention as educational and training means each frame may be recorded in multiplex recording together with digital signals representing a plurality of addresses for frames for the next access. In this manner, one of a plurality of addresses may be selected in accordance with an answer of a learner or trainee for making access to the corresponding frame.

A digital signal multiplex recording system as an embodiment of the invention to achieve the above end will now be described.

FIGS. *5a* and *5b* show, in a block form, an embodiment of the magnetic tape recording and reproducing system according to the invention. More particularly, in this system the operator watching a reproduced stationary picture display can select a next picture to be reproduced. It may be utilized, for example, as means for programmed education where a learner watching a reproduced picture showing a problem and a plurality of answers, either correct or incorrect, to the problem may select one of the answers and push a button on the operating board at an address corresponding to the selected answer, whereby a next picture indicating the next action to be taken comes up in response to the selected answer.

It consists of a recording section illustrated in FIG. *5a* and a reproducing section in FIG. *5b*. In the practical construction, however, some parts may be commonly used for both sections.

FIG. 6 is a waveform chart to illustrate the operation of the above system.

The recording section of the FIG. *5a* will first be described in detail by also having reference to FIG. 6. Reference numeral 11 designates a video signal generator producing output similar to the usual composite television signal including video signal, and horizontal and vertical sync. signals. The output of the video signal generator 11 is coupled to a horizontal sync. signal separator circuit 12 to continually separate the horizontal sync. signal. When a record button on an operating board 13 is pushed by the operator, frame extracting circuit 14 generates an extracting pulse for just one frame in synchronism to the vertical sync. signal from a vertical sync. signal generator 15. The extracting pulse thus generated drives gate circuits 16 and 17 to extract horizontal sync. signal (as shown at d in FIG. 6) and video signal for the period of one frame determined by the vertical sync. signal. The video signal thus extracted is combined with a control signal to be described hereinafter in an adder circuit 18, and the combined signal is coupled to a recording magnetic head for recording on a magnetic tape.

Meanwhile, the horizontal sync. signal extracted through the gate circuit 16 is coupled to a shift pulse generator circuit 20. The shift pulse generator 20 generates a required number of pulses for recording an address signal at a predetermined position of the picture frame. Since the horizontal sync. signal contains much noise for portions corresponding to picture frame edges, the address signal is recorded at a position at which the noise is slight.

FIG. 7 shows an example of the shift pulse generator. It comprises an eight-bit counter and a logic circuit. The counter counts the horizontal sync. signal input. It includes an output circuit providing $2^0$ output undergoing polarity change for each horizontal sync. input pulse, $2^5$ output undergoing polarity change for every 32 input pulses, $2^6$ output undergoing polarity change for every 64 input pulses and $2^7$ output undergoing polarity change for every 128 input pulses. The $2^7$ output and $2^6$ output are fed to an EXCLUSIVE OR circuit (labeled EOR) comprising inverters 37 and 38, AND gates 39 and 40 and an OR gate 41. Thus, if and only if $2^6$ output or $2^7$ output is present (of positive polarity or of logic "1"), the EOR produces an output. The output of the EOR and the $2^0$ and $2^5$ outputs are given to an AND gate 42, so that if and only if the three outputs are present the AND gate 42 produces an output shift pulse. In other words, the shift pulse generator generates shift pulses in blocks each of 16 pulses of the same pulse frequency (double the horizontal sync. frequency) for respective periods between 64-th and 95-th horizontal sync. pulses, between 160-th and 191-st ones, between 352-nd to 383-rd ones and 416-th to 447-th ones in one frame period. These shift pulses correspond in their occurrence to the upper and lower central portions of the picture frame where noise is small. Shown at *e* in FIG. 6 is an example of a shift pulse train. While the illustrated shift pulse train is shown to include four pulses in each block for the sake of simplification, with the generator of FIG. 7 each block actually consists of 16 pulses.

The shift pulse output (at *e* in FIG. 6) of the shift pulse generator 20 is supplied to a separately provided shift register 21, in which a library of digital codes to be recorded on the magnetic tape is stored, and whose content is successively read out in accordance with the shift pulse output, thus obtaining a coded digital signal train (shown at *f* in FIG. 6). The coded signal thus produced is used to drive a following analog gate 23 so as to pass a sinusoidal signal from a sinusoidal signal source 22 through the gate 23 only for the period of the coded signal, as shown in the previously mentioned FIG. 2. The output of the analog gate 23 may thus be thought to be a modulation of the sinusoidal signal with the coded gating pulse signal. The frequency of the above sinusoidal signal is spaced from and below the lower limit of the required video signal frequency band shown in FIG. 1. The modulated sinusoidal signal is amplified through an amplifier 24, whose output is combined with the video signal in the adder 18 mentioned earlier for recording with a recording magnetic head 19 on a magnetic tape.

The reproducing section shown in FIG. *5b* will now be described in detail. FM electric signal recovered by a reproducing magnetic head 25 is demodulated by an FM demodulator 26 to obtain composite video signal including horizontal sync. signal. The output of the FM demodulator is then coupled to an image display section (not shown) in a well known manner, while it is also coupled to a horizontal sync. signal separator 27 to obtain the horizontal sync. signal (shown at *d* in FIG. 6). At this time, the coded signal has no effects upon the video signal since it occupies a low frequency band i.e. the frequency of sinusoidal signal which modulates a code occupies a lower frequency region than the video signal frequency region.

Meanwhile, the output of the reproducing magnetic head is also coupled to a tuned amplifier 28 tuned to the sinusoidal signal frequency to separate the coded digital signal modulation on the sinusoidal signal, from which the original coded signal train is reproduced through a wave shaping circuit 29. The coded digital signal thus reproduced is used to produce an extracting pulse signal through an extracting pulse generator 30. For example, with 16 pulses allotted to each block as mentioned earlier a monostable multivibrator or the like may be used to produce a pulse having a pulse length equal to the block interval upon appearance of the first one of the pulses in each block. The extracting pulse train is added to a selecting circuit 31, which selectively permits one of the input extracting pulses in accordance with one of a plurality of coded address signal blocks (shown at *f* in FIG. 6) delivered from an operating board 36. The selected extracting pulse is added to gates circuits 32 and 33 to respectively extract the coded address signal and horizontal sync. signal at the desired address. A shift pulse generator 35 generates shift pulses of the same bit number as the address signal just written in synchronism to the extracted horizontal signal in synchronizm with the reproduced addressed signal. The extracted address signal is written in a shift register 34 under the control of the shift pulse output.

The address signal thus written is then transmitted as the access address to a picture compilation control circuit (not shown).

In the preceding embodiment, only a single sinusoidal signal of one frequency is provided without recording any control signal for the "0" period. According to the invention, it is also possible to record two control signals of different frequencies (neither of which overlaps the video signal band and the pilot signal) respectively for the "1" and "0" parts of the digital information, as shown in FIG. 8, and reproduce them individually through separate tuned amplifiers.

Figures 9A, 9B:
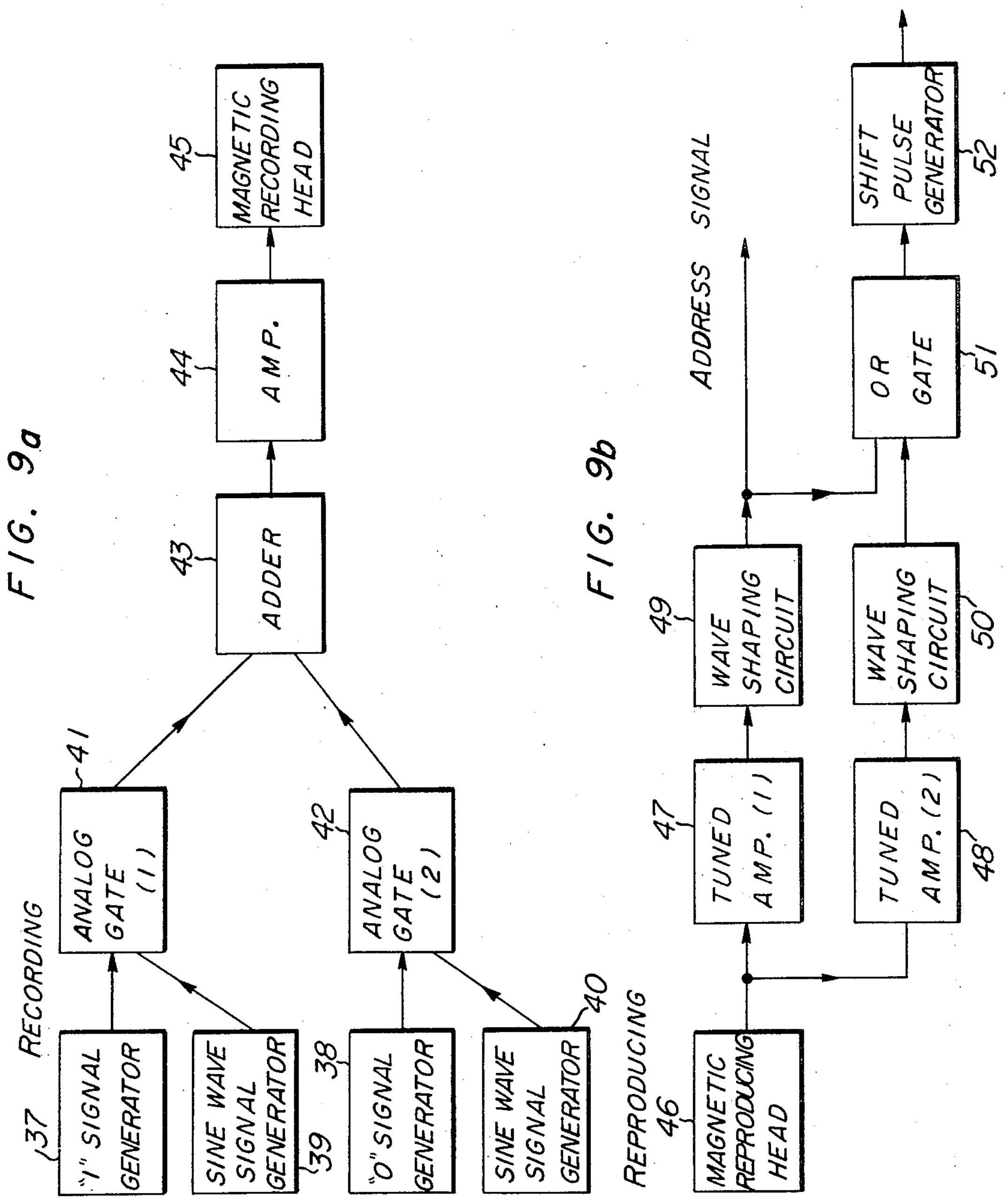

FIGS. 9*a* and 9*b* show part of a modified system, in which sinusoidal waves of different frequencies are assigned to the respective "1" and "0" parts of the digital information as shown in FIG. 8. In this system, the recording section in FIG. 9*a* includes "1" signal and "0" signal generators 37 and 38, sinusoidal signal generators 39 and 40 individually associated to the respective "1" and "0" signal generators, analog gates 41 and 42 individually driven by the output of the respective generators 37 and 38, an adder 43 receiving the output of the gates 41 and 42, an amplifier 44 and a recording head 45. The reproducing section shown in FIG. 9*b* comprises a reproducing head 46, tuned amplifiers 47 and 48 individually separating respective pulse modulated signals, wave shaping circuit 49 and 50 individually receiving the output of the respective amplifiers, an OR gate 51 and a shift pulse generator 52. With this system it is possible to produce shift pulses for writing in the shift register directly from the reproduced address signal. Also, it is possible to eliminate any effects of malfunctioning at the time of separation of the horizontal sync. signal.

I claim:

1. A magnetic tape recording and reproducing system where a television signal and digital information are recorded in multiplex recording on the same area of a magnetic tape, said system comprising;

- a. a circuit for recording digital information, said recording circuit including,
  1. a source of digital information to be recorded,
  2. at least one source of continuous sinusoidal signal at a frequency outside of the frequency band of the television signal,
  3. a modulating circuit to modulate said sinusoidal signal with the digital information to be recorded, and
  4. means to record the output of said modulating circuit in superimposition upon the television signal on a magnetic tape; and
- b. a circuit for separating and recovering the digital information and the television signal recorded on said magnetic tape.

2. The magnetic tape recording and reproducing system according to claim 1, wherein said circuit for recording digital information includes:

1. means to separate the horizontal synchronizing signal from the television signal,
2. a gating circuit for gating the separated horizontal synchronizing signal for the period of a given frame,
3. a shift pulse generating means controlled by the output of said gating circuit for determining the position of recording of the digital information on the magnetic tape,
4. a shift register containing a record of the digital information, said digital information contained in said shift register being read out of said shift register in accordance with the shift pulse output of said shift pulse generating means,
5. an analog gate circuit controlled by the output of said shift register to permit or block of said sinusoidal signal, and
6. an adder for combining the output of said analog gate circuit and the television signal for multiplex recording.

3. The magnetic tape recording and reproducing system according to claim 1, wherein said digital information takes the form of binary codes consisting of "1" and "0" elements, said analog gate circuit being controlled to permit or block a single continuous sinusoidal signal of one frequency in accordance with whether element "1" or element "0" is present on said analog gate.

4. The magnetic tape recording and reproducing system according to claim 2, wherein said digital information takes the form of binary codes consisting of "1" and "0" elements, said analog gate circuit being controlled to switch two continuous sinusoidal signals at different frequencies produced from respective sinusoidal signal sources in accordance with whether element "1" or element "0" is present on said analog gate.

5. The magnetic tape recording and reproducing system according to claim 1, wherein said circuit for separating and recovering the digital information and the television signal recorded on said magnetic tape in multiplex recording includes:

1. a magnetic reproducing head for converting the information recorded on the magnetic tape into a corresponding electric signal,
2. tuned amplifier means for separating the digital information from the electric signal output of said reproducing head,
3. wave shaping means for obtaining coded signal from the output of said tuned amplifier means,
4. an extracting circuit to obtain a plurality of extracting pulses from the output of said wave shaping means, said extracting pulses indicating regions where the digital information is recorded,
5. a selecting circuit for selecting one of a plurality time regions represented by said extracting pulses from said extracting circuit in accordance with external control operation,
6. first and second gate circuits driven by the output of said selecting circuit, said first and second gate circuits respectively selectively passing the output of said shaping circuit and the horizontal synchronizing signal separated from the recovered television signal for the selected time region, and
7. a circuit for deriving a specified portion of the afore-said digital information from the outputs of said first and second gate circuits.

6. The magnetic tape recording and reproducing system according to claim 5, wherein said tuned amplifier means consists of two parallel amplifiers tuned to different frequencies respectively corresponding to the frequencies of two different sinusoidal signals for modification with the respective "1" and "0" elements of the digital information.

* * * * *